July 28, 1970 W. A. COOK 3,521,620
VASCULAR COIL SPRING GUIDE WITH BENDABLE TIP
Filed Oct. 30, 1967
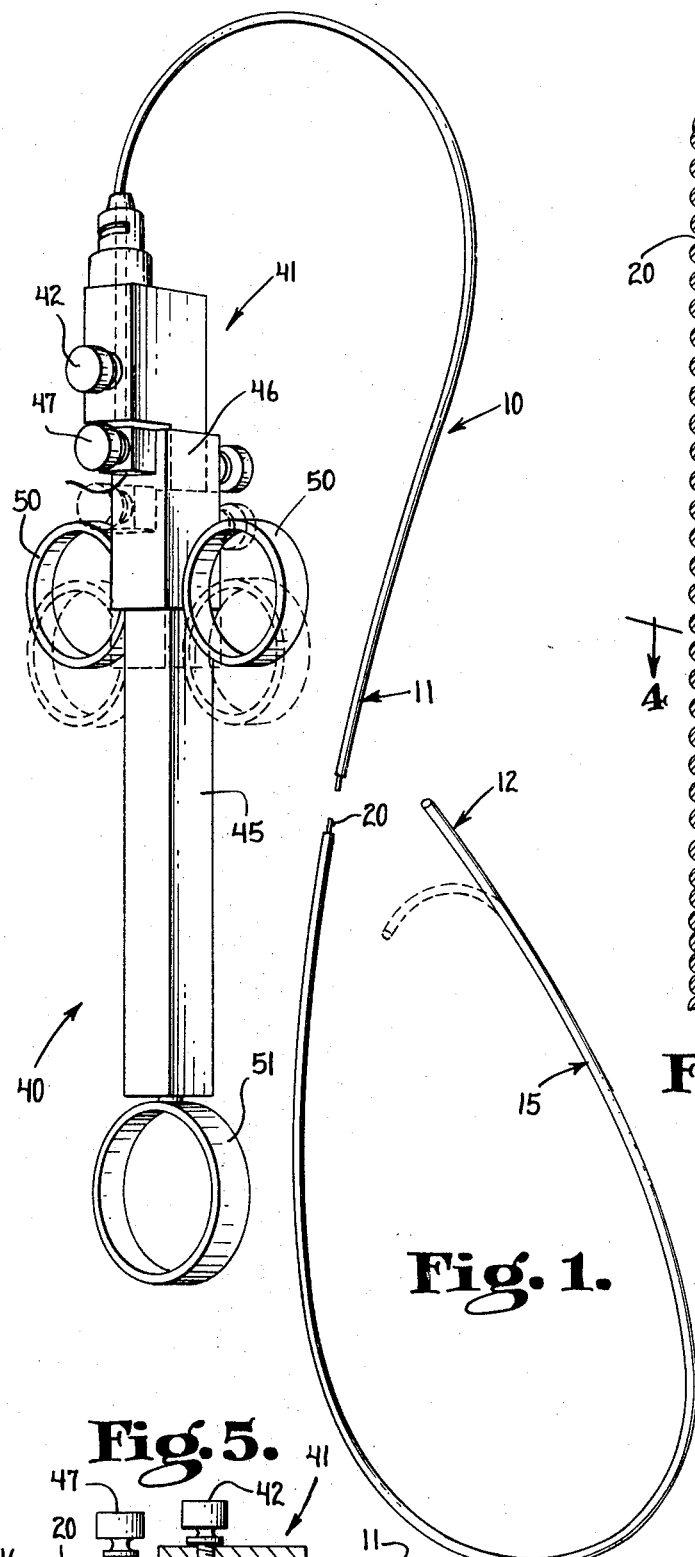
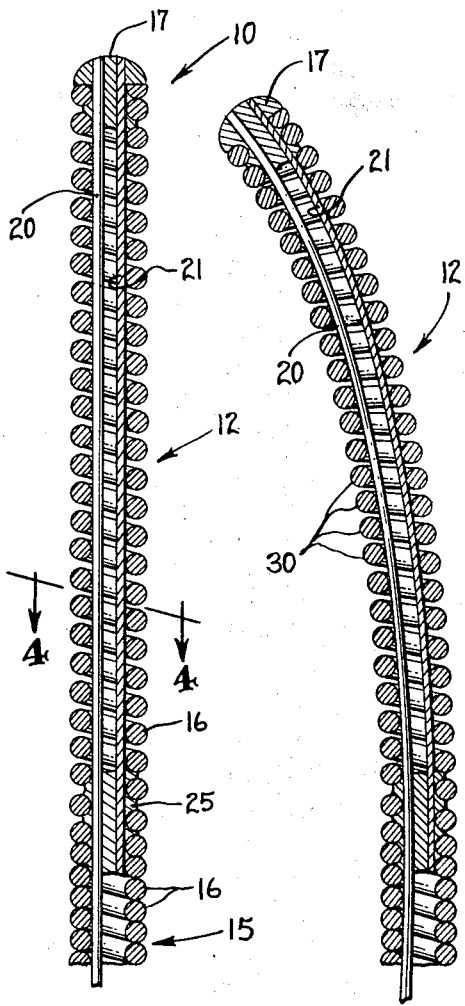
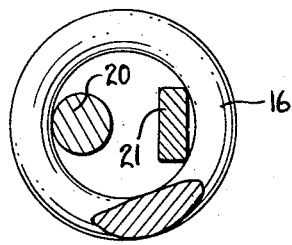
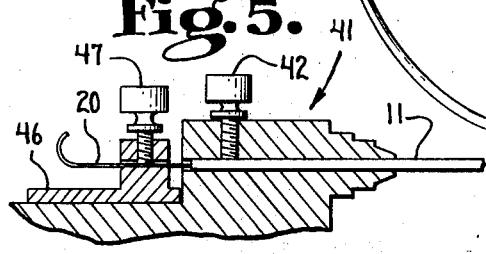
Fig. 1.
Fig. 2.
Fig. 3.
Fig. 4.
Fig. 5.
INVENTOR.
WILLIAM A. COOK
BY Woodard, Weikart, Emhardt & Naughton
Attorneys

United States Patent Office 3,521,620
Patented July 28, 1970

3,521,620
VASCULAR COIL SPRING GUIDE WITH BENDABLE TIP
William A. Cook, 925 S. Curry Pike, Bloomington, Ind. 47401
Filed Oct. 30, 1967, Ser. No. 678,979
Int. Cl. A61b *17/00;* A61m *23/00*
U.S. Cl. 128—2.05     4 Claims

ABSTRACT OF THE DISCLOSURE

A coil spring guide having a pair of wires secured to the distal end of the coil spring and extending through the coil spring. One of the wires is fixed to the coil spring at a location spaced from the distal end and holds the coils of the coil spring apart so that the coil spring bends when the other wire is made taut.

BACKGROUND OF THE INVENTION

Field of the invention

The present invention relates to coil spring guides for use in cardiovascular disease studies and diagnosis and the like.

Description of the prior art

Coil spring guides are used to provide a certain amount of rigidity to a plastic tube when the plastic tube is inserted and advanced in the vessels of the body. The coil spring guide also functions to provide a flexible tip in front of the tube or catheter in order to prevent inadvertent puncture of the vessel when the catheter is being moved therethrough.

Such coil spring guides may be used in a procedure known as catheterization by the percutaneous entry technique. The instruments used in such a procedure or technique are the coil spring guide, a long hypodermic needle, a sharp point for the needle and a plastic tube or catheter. The needle is injected into a selected vessel which is normally the femoral artery or vein of the leg. The sharp point for the needle is then removed and the coil spring guide is inserted through the lumen of the needle into the body vessel. Next the needle is removed from the body vessel and removed from the coil spring guide.

With the coil spring guide started in the vessel, the plastic catheter is threaded over the guide and is pushed to within three to four centimeters of the distal tip of the guide whereby the guide may be used as a leader for the catheter. The catheter and guide are then advanced in the artery or vein to the injection site. When the injection site is reached, the guide is withdrawn and the catheter is connected to a suitable high pressure injection apparatus which fires dye into the body vessel. During the injection procedure, an X-ray filming operation permits a visualization of the suspected abnormality.

In theory, the above described procedure is excellent. It has been found, however, that manipulation of the coil spring guide is difficult because it is impossible to transmit torque from the hand of the doctor up the guide to the distal end thereof. Also, control of the tip of the guide is difficult or impossible.

SUMMARY OF THE INVENTION

One embodiment of this invention might include a coil spring guide comprising a coil spring having a distal end, a wire secured to said distal end and extending through said coil spring, a second wire secured to said distal end and extending inside of said coil spring to a location spaced from said distal end, said second wire being secured to said coil spring at said location, said coil spring having coils which are spaced apart between said distal end and said location whereby making said first wire taut causes the coils of said coil spring to be pulled together and causes said coil spring to bend between said location and distal end.

One object of this invention is to provide an improved coil spring guide.

Another object of this invention is to provide a coil spring guide which is controllable to rotate the tip of the guide and to angle or aim the distal tip of the guide so that it can be guided into body vessels having passages arranged at angles to one another.

Still another object of this invention is to provide a coil spring guide, the distal tip of which can be directed with a strong positive force for directing the coil spring guide into body vessels.

Related objects and advantages will appear as the description proceeds.

BRIEF DESCRIPTION OF THE DRAWING

The full nature of the invention will be understood from the accompanying drawings and the following description and claims.

FIG. 1 is a perspective view of the coil spring guide of the present invention showing it mounted upon a holding and controlling device.

FIG. 2 is an enlarged longitudinal section of the distal end portion of the coil spring guide of FIG. 1.

FIG. 3 is a view similar to FIG. 2 but showing the coil spring guide in a different operating position.

FIG. 4 is an enlarged section taken along the line 4—4 of FIG. 2 in the direction of the arrows.

FIG. 5 is a section taken through a portion of the structure of FIG. 1 to show the mounting of the coil spring guide upon a holder and control apparatus.

DESCRIPTION OF THE PREFERRED EMBODIMENT

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawing, there is illustrated a coil spring guide 10 which includes a relatively tightly wound coil spring 11 having a distal end portion 12 which is not so tightly wound as is the remaining portion 15 of the coil spring guide. The coil spring 11 may have length as great as 145 centimeters or greater, if desired, with an average length being perhaps 125 centimeters. The diameter of the coil 16 can range from approximately .025 inch to approximately .052 inch and, of course, depends upon the size of the catheter to be placed in the body vessel which in turn depends upon the size of the body vessel.

The coil spring 11 has a tip member 17 which may be, for example, solder while the coil spring 11 is formed of spring steel. Connected to and embedded within the solder 17 is a relatively fine wire 20 which has an approximate diameter of .005 to .002 inch. Also connected to and embedded within the solder 17 is a relatively fine but flat wire 21 which has a rectangular cross section with the witdh of the cross section being approximately three times the height of the cross section. The relative sizes of the wire 20 and the wire 21 are perhaps best illustrated in FIG. 4.

As mentioned above, the coil spring 11 is a relatively tightly wound spring. Thus, the portion of the wire 15 is sufficiently tightly wound that the adjacent coils 16 engage one another. At the distal portion 12 of the spring 11, however, the coils 16 are spaced apart so that approximately four of the coils 16 occupy the same space occupied by approximately six of the coils 16 in the portion 15. The diameter of the coils 16 in the portion 15 is, however, equal to the diameter of the coils 16 in the portion 12. The portion 12 and the portion 15 of the coil spring 11 are separated by solder 25. The solder 25 firmly secures the flat wire 21 to the coil spring. The wire 20, however, extends through and is slidable through the solder 25. Such a construction can be effected by the person manufacturing the present device soldering the flat wire 21 in position while at the same time slightly moving the wire 20 to keep it free from adhering to the solder 25. Just as soon as the solder 25 has cooled, the flat wire 21 will be firmly secured thereto and the round or cylindrical wire 20 will be free of the solder 25 and slidable therein.

After the above described manufacturing step has been performed, the tip member 17 of solder can be produced or formed so as to fixedly attach the wires 20 and 21 to the tip 17. Next, the ends of the wires 20 and 21 are clipped off at the distal end of the coil spring 11 and a small amount of additional solder is added or melted onto the distal tip of the coil spring to provide the rounded end on the member 17.

It will be noted that the flat wire 21 is positioned adjacent or in engagement with the inside surface of the coils 16 on one side of the coil spring 11 while the wire 20 is positioned on the other side thereof. The function of the flat wire 21 is to maintain the coils 16 in the distal portion 12 of the coil spring apart and spaced at the spaced apart relationship shown in FIGS. 2 and 3. One function of the wire 20 is, to draw together the portions 30 of the coils 16 on one side of the distal portion 12 of the coil spring 11 so as to cause the distal portion 12 to bend in the manner illustrated in FIG. 3. It has been found that an extremely great amount of bending force can be generated by causing the wire 20 to become taut in the manner illustrated in FIG. 3.

Referring more particularly to FIG. 1, there is illustrated a controlling and holding tool 40 which includes a first element 41 to which the coil spring 11 is fixed by means of a set screw 42, the set screw 42 being threadedly received in the element 41. The element 41 includes a bar portion 45 upon which a further element 46 is slidable. The wire 20 extends completely through the coil spring 11 out the proximal end thereof and is fixed to the slidable element 46 by means of a set screw 47 threadedly received in the slidable element 46. The slidable element 46 has a pair of finger holes or holders 50 mounted thereon for receiving the first and second fingers of the hand while the thumb of the hand is inserted through the thumb hole or holder 51 fixedly mounted on the element 41. It can be appreciated that various devices such as the device 40 can be provided for placing a tautness in the wire 20 relative to the coil spring 11 which surrounds it and the device 40 forms only an example of such a device. Referring to FIG. 5, the details of attachment of the coil spring 11 and the wire 20 to the device 40 are illustrated.

It will be evident from the above description that the present invention provides a coil spring guide which is controllable to rotate the tip of the guide. It has been found that this procedure can be accomplished by rotating the holder 40 since the coil spring 11 with its wire 20 will transmit rotation through the length of the coil spring guide 10. It will also be evident that the present coil spring guide incorporates means for angling or aiming the distal portion of the guide so that it can be guided into body vessels having passages arranged at angles to one another. The coil spring guide of the present invention has been proved in actual use to produce a strong positive force for directing the distal end portion of the guide.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A coil spring guide of a size for use within the vascular system of the body comprising a coil spring of substantially uniform diameter throughout its entire length having a distal end and a proximal end, a first wire secured to said distal end and extending through said coil spring, a second wire secured to said distal end and extending inside of said coil spring to a location spaced from and between said ends, said second wire being secured to said coil spring at said location, said second wire extending along one side of said coil spring inside of said coil spring between said distal end and said location, said second wire having opposite ends at said distal end and said location, said coil spring having coils which are spaced apart between said distal end and said location whereby making said first wire more taut causes the coils of said coil spring to be pulled together and causes said coil spring to bend between said location and distal end.

2. The coil spring guide of claim 1 wherein said second wire has a rectangular cross section with the width of said cross section being approximately three times the height thereof, said second wire being positioned against the inside surface of said coil spring with the width of said cross section against said inside surface.

3. The coil spring guide of claim 1 additionally comprising means for making said first wire taut in said coil spring.

4. The coil spring guide of claim 1 additionally comprising a first portion of solder at the distal end of said coil spring and a second portion of solder at said location, said first portion of solder securing said first wire and said second wire to said coil spring at said distal end, said first portion of solder extending between and contacting said coil spring and said first and second wires, said second portion of solder securing said second wire to said coil spring at said location, said second portion of solder extending between and contacting said first and second wires and said coil spring, said first wire being slidable through and extending through said second portion of solder whereby said second portion of solder acts as a bearing for said first wire.

References Cited

UNITED STATES PATENTS

| 623,022 | 4/1899 | Johnson | 128—239 X |
|---|---|---|---|
| 2,118,631 | 5/1938 | Wappler | 128—349 |
| 2,649,086 | 8/1953 | Sluijter | 128—127 X |
| 3,416,531 | 12/1968 | Edwards | 128—348 |

OTHER REFERENCES

Smith et al.: Surgery, vol. 27, No. 6, June 1950, pp. 817–18.

DALTON L. TRULUCK, Primary Examiner

U.S. Cl. X.R.

128—303, 348, 356